H. E. DEY.
APPARATUS FOR CONTROLLING ELECTRIC MOTORS.
APPLICATION FILED MAY 21, 1909.
942,198. Patented Dec. 7, 1909.
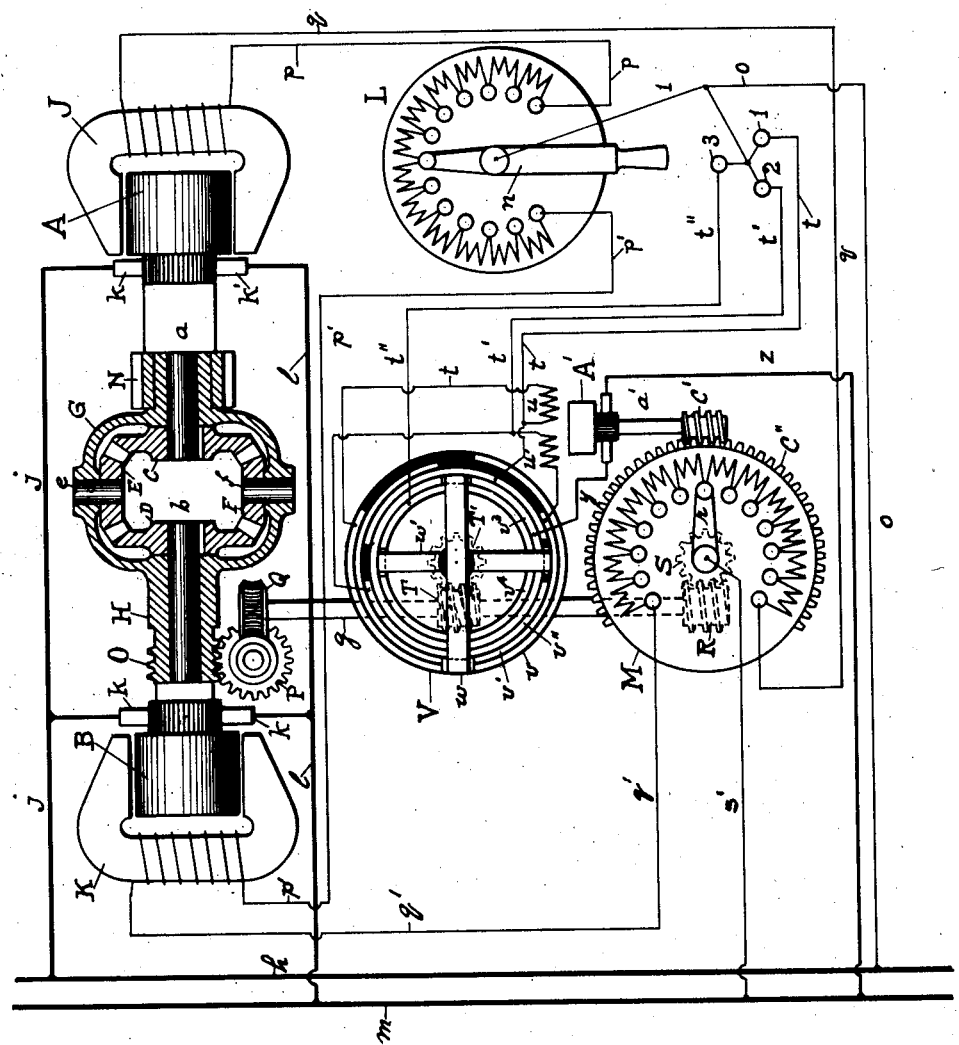

UNITED STATES PATENT OFFICE.

HARRY E. DEY, OF JERSEY CITY, NEW JERSEY, ASSIGNOR TO BEN T. CABLE, OF NEW YORK, N. Y.

APPARATUS FOR CONTROLLING ELECTRIC MOTORS.

942,198.  Specification of Letters Patent.  Patented Dec. 7, 1909.

Application filed May 21, 1909. Serial No. 497,423.

*To all whom it may concern:*

Be it known that I, HARRY E. DEY, a citizen of the United States, and a resident of Jersey City, in the county of Hudson and State of New Jersey, have invented certain new and useful Improvements in Apparatus for Controlling Electric Motors, of which the following is a specification.

My invention relates to that class of apparatus in which the speed of the load is controlled by a differential electrical effect on two motors. Each motor is essentially composed of the usual elements known as an armature and a field. Current is supplied to these motors and the field magnets and is usually drawn from main line wires. That portion of the current which energizes the field magnets passes through resistances or rheostats by means of which the field strength of one motor is varied relative to that of the other. When the field magnets of the two motors are so energized as to be of about the same strength the load remains stationary. When they are of different strengths the load will receive motion determined by the difference between the motions of the two motors. That this motion, received by the load, will be in one direction or the other according to which of the motors has the greater speed at the time, necessarily follows. Assuming each motor circuit to receive the same strength of current from the main line wire or other source of energy, variations in the strength of the field magnets are produced by cutting in or cutting out resistance from their circuits. Therefore, the relative strength of the field magnets of the two circuits can be varied at will by so moving the arm of the rheostat as to interpose greater resistance in one circuit than the other proportionate to the difference in strength desired. This may be done by different rheostats for the two circuits but I prefer to employ a single rheostat, serving as a primary resistance for controlling both circuits as more convenient, because in this way, a single motion of the arm of the rheostat will cut into one circuit the same amount of resistance which it cuts out of the other.

When controlling a load at a distance where it is not practicable to observe the amount of motion of load, for example, the rudder of a ship controlled from the bridge, it has been found desirable to move the indicator located at the controlling station to the desired position of the rudder, and have the rudder move to that position and automatically stop. To accomplish this in the simplest way I provide in addition to the controlling rheostat a second rheostat mechanically operated by the load and connected in series with the magnets and the controlling rheostat. As the second rheostat is moved by the load it adds resistance to the low resistance side and cuts out resistance from the high resistance circuits and thus when it arrives at the predetermined position the two circuits become balanced and the load comes to a standstill. This principle of using a primary resistance to vary and control the relative strength of the field magnets of two dynamo electric machines, and a counter resistance operated with the load to restore the balance of the circuits may be applied to various forms and uses of dynamo electric machines.

In the accompanying drawing I have shown my invention as applied to two simple motors rotating in opposite directions and working upon the load shaft through a differential gear.

A, B, are the motors mounted upon the shafts $a$, $b$, respectively, on the end of which are the bevel gear C, D, respectively which mesh with the pinions E, F, mounted on the shafts $e$, $f$, respectively. These shafts are journaled in the shell or drum G in the interior of which the said four bevel gears are mounted and which itself forms a part of a sleeve H loosely surrounding the shafts $a$, $b$. The motors A, B, are provided respectively with the field magnets J, K, which are connected with the primary rheostat L, and the secondary rheostat M by suitable wiring as hereinafter explained.

The sleeve H carries a spur gear N from which power is communicated to the load so that said sleeve may be regarded as the load shaft. This sleeve also carries a worm O, which meshes with the worm wheel P on an independent shaft, and which in turn engages the worm wheel Q, on shaft $g$ which may be called the secondary rheostat shaft. This shaft carries the worm R, which meshes with the worm wheel S of the rheostat M and also carries the worm T the purpose of which will be hereinafter explained.

The wiring of the motors and their fields, with the two rheostats is preferably as follows:—Main feed wire $h$, supplies current to the motors A, B, through the wire $j$ by the aid of suitable brushes $k, k$, and the return current passes out through the brushes $k', k'$, through the return wire $l$ to the main return wire $m$. The main feed wire $h$ is connected with the arm $n$ of the primary rheostat L through the wire $o$. From one end of this rheostat the wire $p$ leads to the field magnet J while from the other end of the rheostat the wire $p'$ leads to the field magnet K. The arm $n$ is moved by hand to the right or left. As shown the arm is at the center and therefore the resistance is equally divided between the two field circuits. By turning this arm to the right the resistance is added to the circuit of field K and cut out of field J. When the arm however is turned to the left resistance is added to the circuit of field J and cut out from that of field K. The return wires $q, q'$ from the field magnets respectively lead to opposite ends of the secondary rheostat M and thence through the arm $r$ to the main return wire $m$ by the wire $s'$.

The operation of the device, as thus far described is as follows:—With the arm $n$ of the primary or transmitting rheostat L at the central position as shown in the drawing, there will be an equal amount of resistance in each field. Consequently both fields will be of equal magnetic strength and the tendency of both motors will be to rotate at the same speed, but in opposite directions. The bevel gear C, D, will thus revolve at equal speed turning the gear E, F, upon their axes but with no tendency to rotate the drum G in which they are located. There will therefore be no rotation of the load shaft H. If the arm $n$ of the rheostat L is turned to the left it cuts out resistance from the field magnet K and at the same time adds resistance to field magnet J. This reduces the speed of the armature of motor B and increases that of motor A. The difference of speed thus produced between the gears C, D, in favor of C produces by well known laws a rotation of the drum G in the direction determined by the gear C, equal to one half the difference in speed between C and D, and the load is moved accordingly. If however, the arm $n$ of the rheostat L is turned to the right, the magnetic strength of the magnet J is increased while that of magnet K is decreased, thus causing the armature of the motor A to lose speed while that of motor B gains speed. The difference of speed thus produced between the gears C, D, is in favor of D and the rotation of the drum G and the motion of the load again equals half the difference in speed between the two gears but in the opposite direction from that caused by turning the arm of the rheostat to the left. Whenever the load rotates, the arm $r$, of the rheostat M, is moved by means of the worm O, worm wheel P, worm gear Q, shaft $g$ and worm R in a direction so related to the movement of the arm $n$ of rheostat L as to tend to bring the two resistances back to an equality by cutting in at the secondary rheostat an amount of resistance equal to that cut out at the primary rheostat for one circuit, and cutting out the amount cut in for the other circuit. As soon as the two resistances have been made equal again, the load becomes stationary. In addition to this somewhat synchronous control of the two rheostats, it is often desirable to control the secondary rheostat and the load directly without using the primary rheostat. To accomplish this I have devised a direct-action control and cut off which I will now describe.

A small motor A', is mounted on the shaft $a'$ which carries a worm C' which engages a gear C'' mounted on the resistance carriage of the rheostat M. Rotation of this motor A' in either direction therefore turns the resistance carriage without moving the arm $r$ and thus disturbs the electric balance of the fields J and K resulting in a corresponding rotation of the load-shaft. This rotation returns the arm $r$ to its central position by moving it to correspond to the displacements of the carriage. The current to drive the motor A' is received from the main feed wire $h$, through the wire $o$, by the push-buttons or other switch, 1, 2, 3. The operation of this push button control instead of the primary rheostat control is effected through a novel combined automatic switch and cutoff V which I have devised for this purpose, and to which the push buttons are connected by suitable wires $t, t'$ and $t''$. One of these buttons directs the current so that the motor A' will move in one direction, the second push button directs the current so as to cause the motor A' to move in the other direction, while the third push button turns the current back from the combined switch and cut-off so that the rheostat M is brought back to its normal position. The first two push buttons, in cases of ship control, may be called the larboard and starboard push buttons as one will cause the ship to go to port and the other to starboard. This combined switch and cutoff consists essentially of five concentric isolated rings $v, v', v'', v^3, v^4$, and two arms $w, w'$, sweeping over the rings as turned by the worm wheel T' meshing with the worm T on shaft $g$ as before mentioned. The arm $w$ connects the two outer rings $v, v'$ with the next to the inner ring $v^3$, while the other arm $w'$ connects the inner ring $v^4$ with the middle ring $v''$. It will be noticed that the contact surface of the two inner rings is continuous and that of the other three rings is broken by insulating spaces. It will also be noticed that the insulating spaces of the two outer rings are quite extended and overlap at their meeting ends. The object of this construction is that when the arm $w'$ is turned to the right it connects the inner ring with that portion of the middle ring which is in electrical connection with a larboard button, while when turned to the left makes such connection with that portion of the middle ring which is connected with the starboard push button. On the other hand, when the arm $w$ is turned so as to sweep over the insulating portions of the outer rings it may cut out either of the rings but is always in position to be returned by a current from the opposite push button. The operation of this push button control through the combined switch and cutoff may be briefly described as follows:—When the push button 1 is pushed, the current flows through wire $t$, field $u$, to the outer ring $v$; thence across bar or arm $w$ to the inner ring segment $v^3$ thence by the wire $y$ to the armature $A'$ and through the return wire $z$ to the main return wire $m$. As a result of establishing this circuit the pilot motor $A'$ turns the rheostat M in one direction as far as desired. Later the electrical balance is restored by the operation of the shaft $g$ as before described. When however the push button 2, is pushed, the current passes over the wire $t'$ through the field $u'$ to the ring segment $v'$ thence along the bar $w$ to the ring $v^3$ wire $y$, and armature $A'$ turning it in the opposite direction. Should it be desired at any time to return the load, in this case rudder of the ship, to its initial position, the third push button 3 is employed. When this in done a current passes through the wire $t''$ to the inner ring $v^4$. Should the apparatus be in the position shown in the drawing no effect would be produced, but as the arms $w$, $w'$, must have been shifted somewhat to the right or left according as button 1 or button 2 has been used, the arm $w'$ will be in position to connect said ring $v$ with that half of the middle ring $v''$ which corresponds or is connected with the unused push button. The current is thus automatically switched to the proper one of the other buttons to cause it to return to the midship position and is there automatically cut out by the insulated section. Another use for this push button control is to apply it to the primary rheostat instead of the secondary. All that this requires is to connect the motor $A'$ to the arm or base of the rheostat L instead of to the rheostat M.

The many uses and advantages of this invention will, I think, be readily understood without further explanation.

I claim:

1. An apparatus for controlling electric motors which consists of a number of dynamo-electric machines, a rheostat whereby the relative strength of the field magnets of said machines is varied and controlled, and a pilot motor operating said rheostat;—said rheostat being also operated with the load to restore said rheostat to its normal position.

2. An apparatus for controlling electric motors which consists of a number of dynamo-electric machines, a rheostat whereby the relative strength of the field magnets of said machines is varied and controlled, a pilot motor operating said rheostat and a combined switch and cut-off under push button control whereby said pilot motor is operated and controlled;—said rheostat being itself operated with the load to restore said rheostat to its normal position.

3. In an apparatus for controlling electric motors, a combined switch and cut-off which consists of a number of concentric insulated rings and a number of arms adapted to pass over the same, in such manner as to supply current to a suitable pilot motor and cause the same to rotate in one direction or the other as desired, or to cut off the current automatically at the end of the stroke and at the central position when required and a pilot motor to which said current is applied.

4. In an apparatus for controlling electric motors, a combined switch and cut-off whereby the operation of the driven mechanism is controlled, and which consists mainly of a three push button control,—one button causing said driven mechanism to move in one direction, another button causing said mechanism to move in the opposite direction, and the third button acting to restore said mechanism to its central position.

HARRY E. DEY.

Witnesses:
W. P. Preble, Jr.,
Helen G. Murphy.